Jan. 23, 1968           D. S. STACEY           3,365,623

AUTOMATIC CONTROL SYSTEM

Original Filed June 30, 1964

INVENTOR.
DAVID S. STACEY
BY
ATTORNEY

United States Patent Office 3,365,623
Patented Jan. 23, 1968

3,365,623
AUTOMATIC CONTROL SYSTEM
David S. Stacey, Boulder, Colo., assignor to Ball Brothers Company Incorporated, Muncie, Ind., a corporation of Indiana
Continuation of application Ser. No. 379,229, June 30, 1964. This application June 27, 1966, Ser. No. 560,835
9 Claims. (Cl. 317—148.5)

ABSTRACT OF THE DISCLOSURE

An automatic control system having a voltage comparator circuit wherein an input signal is compared in magnitude with a reference signal and an output provided when a predetermined difference occurs to cause a tunnel diode in the comparator circuit to change states. A plurality of comparator circuits are utilized to cause sequential operation of a plurality of valves.

---

Figure 1:
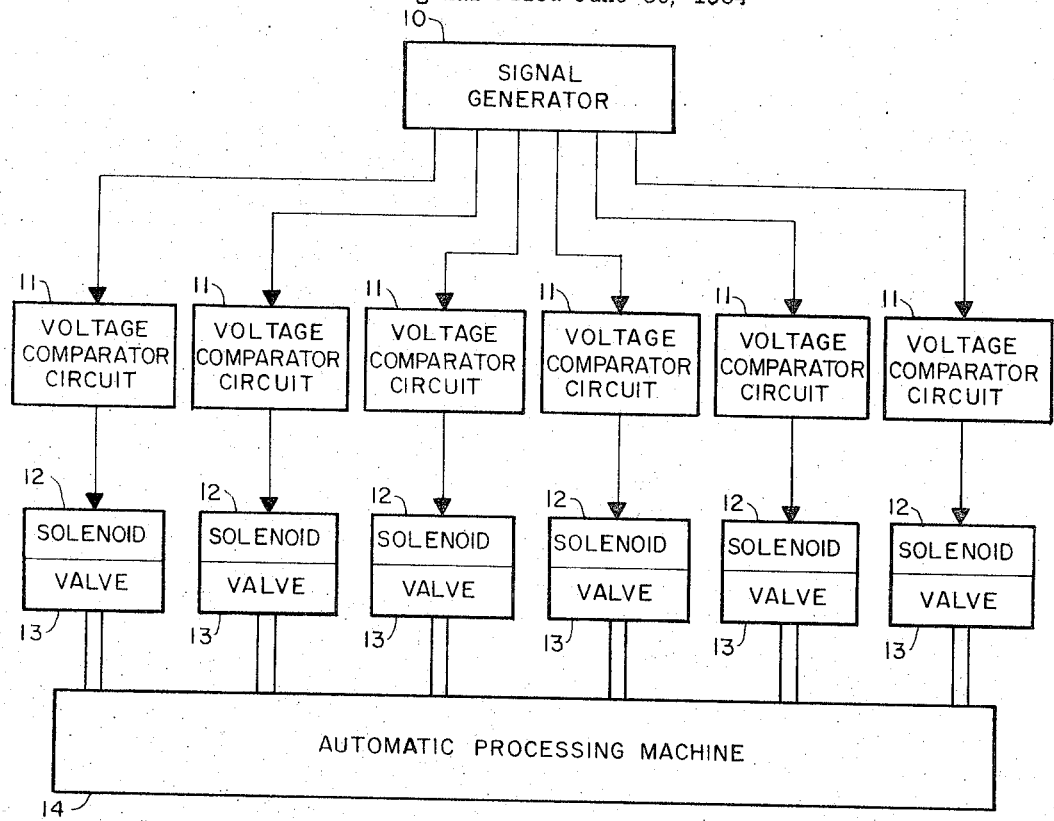

This application is a continuation of copending U.S. application Ser. No. 379,229, entitled "Automatic Control System Having Signal Comparison Means" filed June 30, 1964, and now abandoned.

This invention relates to a novel automatic control system and more particularly to an automatic control system for use with processing machines.

In the past, many processing machines have been controlled by mechanical means such as a system of gears, cams, and levers. Often, it has been difficult to adjust accurately such systems to operate at different speeds or to effect changes in the timing of various operations of a process. Furthermore, wear of the mechanical parts caused further inaccuracies to appear in the timing and adjustment of the control systems. In addition, the mechanical control systems employed often were unable to operate when the forming speed was greatly increased.

A specific example of such a control system is that employed on a glass-forming machine of a type normally referred to as an individual section glass-forming machine or I.S. machine. In manufacturing practice, a number of sections are normally lined up side-by-side, and arranged back-to-back to form a machine which functions as an integral unit with a conveyor system, as well as with a feeder transferring glass gobs from a furnace. In the past, each section has been controlled by a large rotatably mounted cylindrical drum carrying a plurality of buttons or cams which are mounted in peripheral slots in the surface of the drum. As the drum revolves about its axis, the cams sequentially contact a number of pneumatic valves and actuate them once during each cycle of operation. Thus, one rotation of a drum carrying a number of cams constitutes and measures off one complete cycle of operation of such a section. The pneumatic valves are connected to a number of air cylinders attached to parts of the glass-forming machine so as to operate the machine. The drums for a group of sections are all driven by a common shaft so that all of the sections grouped to form a machine operate sequentially in receiving gobs of glass from a feeder.

It can readily be appreciated that as such a system operates over a long period of time, wear of the cams results in changes in the timing of various functions or steps performed by the machine. Furthermore, wear of the cams also results in less movement of the valves, and therefore, the action of the valves and the corresponding action of the air cylinders is slower than desired, resulting in further changes in timing. In addition, it is extremely cumbersome to individually adjust each cam in order to retime the machine, as well as to compensate for wear of the cams and air cylinders to get the same degree of valve movement.

Normally, processing machines and especially glass-forming machines perform more satisfactorily in continuous operation, and it can be well understood that to stop intermittently the operation of such machines for repair or adjustment has detrimental effects on the article produced. This is partly due to the fact that a glass-forming machine such as I.S. machine achieves a thermal balance after a period of continuous operation and may run with very little adjustment for long periods of time, if the timing of various functions is not changed. However, cessation of production for even a short period of time upsets the thermal balance of the machine and process, and results in the formation of many damaged and deformed articles until the entire system again returns to a thermal balance.

To eliminate this problem, operators attempt to adjust the timing of the machine as it is running. This is extremely difficult and requires a high degree of skill. As the speed of operation of such glass-forming machines increases, it becomes more difficult and dangerous for operators to adjust the peripheral position of the cams on the cylindrical drum while the drum is revolving. In addition, accuracy is hard to obtain in setting each cam, and therefore, the process is very difficult to time accurately. Futher increases in the speed of glass-forming machines, such as I.S. machines, to increase the rate of production of glass articles, create serious difficulties in timing the machine while it is in operation.

Another deficiency in control systems presently employed on I.S. glass-forming machines is that they are limited to a specific number of functions or operations which can be performed on each section. Thus, the cylindrical drums employed on glass-forming machines of the I.S. type provide only a limited number of peripheral slots and thus allow only a limited number of functions or operations to be controlled on each section. To expand the present mechanical systems employed would render the I.S. machine controls even more cumbersome and space-consuming than they are at present. However, present-day glass-forming methods make it desirable to increase the number of functions or operations to be performed or controlled on each section.

In view of these and other disadvantages and shortcomings of control systems heretofore employed, it was completely unexpected and surprising to discover an automatic control system, the timing of which can be easily adjusted during continuous operation of a processing machine and which control system is capable of operating such a machine at an increased speed. In addition, the control system of the present invention operates electrically and is completely automatic. Therefore, it is not subject to many of the problems associated with presently-known control systems.

A control system of the present invention generally comprises means to generate a variable voltage signal and means to feed the voltage signal into one or more voltage comparator circuits. Each of these voltage comparator circuits is arranged to generate a pulse at a particular time during a processing cycle, as indicated or represented by the above generated voltage signal when the signal amplitude slightly exceeds by a preselected amount the amplitude or voltage level of a particular reference signal with which it is compared. The pulses generated are individually fed to pulse actuated valve means which are arranged to operate a processing machine.

Figure 2:
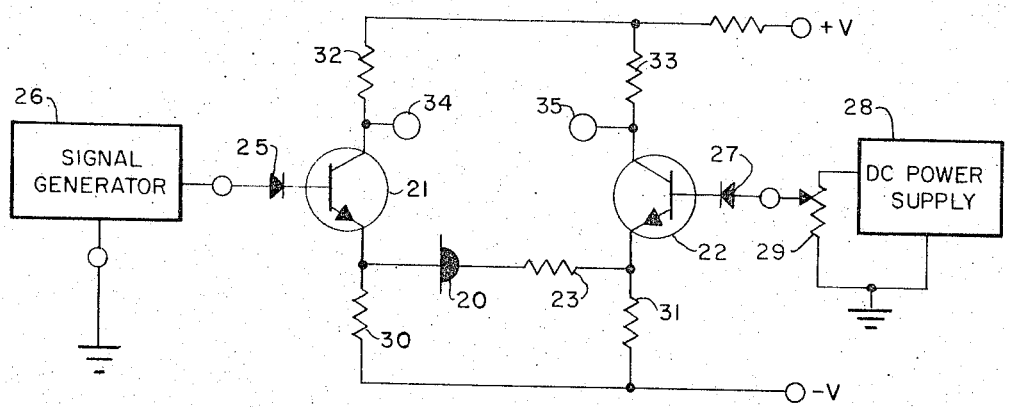

The control system of the present invention will be described in detail with reference to the accompanying drawings, in which:

FIGURE 1 is a schematic block diagram of a typical arrangement of an automatic control system of the invention; and FIGURE 2 is a circuit diagram of an embodiment of a voltage comparator circuit of the invention.

Referring now to FIGURE 1, a signal generator 10 is arranged to generate a signal having a waveform which incrementally or gradually varies throughout a cycle of operation of a processing machine. The signal generated by signal generator 10 is electronically going more positive or more negative in voltage. This signal is fed to each of the six voltage comparator circuits 11 shown in FIGURE 1. Each voltage comparator circuit 11 determines the point where a particular preselected voltage level or current level is reached and triggers a circuit which generates a control pulse. A pulse generated by one of the voltage comparator circuits 11 is fed to a solenoid 12, one of which is connected to each voltage comparator circuit 11. Each solenoid 12 is arranged to operate one of the valves 13. As schematically shown in FIGURE 1, a valve 13 may be used to control any particular function on automatic processing machine 14.

The apparatus schematically illustrated by FIGURE 1 is a three-step processing machine in which a single signal generator 10 supplies a signal to a plurality of voltage comparator circuits 11, in order to sequentially synchronize the operation of the machine through a particular process. Thus, voltage comparator circuit 11 must operate with a second voltage comparator circuit 11 to control one function so that function can be started by a first voltage comparator circuit 11 and stopped by a second voltage comparator circuit 11 set for a later time in the processing cycle. Also, in the arrangement shown, the valve operates sequentially in response to pulses sequentially generated by voltage comparator circuit 11.

Thus, apparatus schematically illustrated in FIGURE 1 may be used to control a three-step processing machine, such as apparatus for determining the neck size of articles, such as glass containers, with a test probe or plug gage. For example, one voltage comparator circuit and its respective solenoid valve could be employed to transfer a particular container onto a conveyor belt at a particular time in a processing cycle, and a second voltage comparator circuit and its respective solenoid valve could be employed to return the transfer mechanism to its initial position. A third voltage comparator circuit and associated solenoid valve could be arranged to insert a test probe into the container to check the neck size of the container, and a fourth voltage comparator circuit and associated solenoid valve could withdraw the test probe from the interior of the container. Further, a fifth voltage comparator circuit and associated solenoid valve could be employed to reject defective containers after indication by a detector circuit, and a sixth voltage comparator circuit and associated solenoid valve could be used to return the reject arm to its initial position. Each of the above functions would be sharply controlled as to time by a control apparatus of the invention operating over at least that portion of a processing cycle.

For maximum flexibility and ease of operation, it is preferable to have one voltage comparator circuit and one pulse actuated valve acting in combination to perform one function such as starting a particular step of a process, and a second combination of the same two mechanisms acting to perform a second function such as stopping that particular step of a process.

The preferred signal to be utilized with the present invention is a voltage signal having a saw-tooth waveform. Such a waveform is preferably in the form of a ramp function. That is, a function having either a gradually increasing or decreasing portion and a correspondingly infinitely short decreasing or increasing portion, respectively. Thus, the relative amplitude of the gradually increasing or decreasing portion of the signal indicates the amount of a processing cycle completed in any particular time. Electronically, the signal is going more positive or more negative in voltage. It should be understood that other waveforms could also be used to advantage, providing that they incrementally or gradually vary throughout at least a portion or all of a cycle of a processing machine.

FIGURE 2 shows an embodiment of a voltage comparator circuit 11 of the invention. A tunnel diode 20 has one of its terminals connected to a first transistor 21 and the other connected to a second transistor 22. Transistors 21 and 22 have collector, base and emitter electrodes and act as emitter-followers. A load resistor 23 is connected in series in the circuit between the second transistor 22 and the tunnel diode 20. The base of the first transistor 21 is connected through a diode 25 to voltage signal generator 26. The base of the second transistor 22 is connected through a diode 27 and a variable resistor 29 to a direct current signal source 28. The diodes 25 and 27 serve as protective diodes and prevent excessive current from flowing through transistors 21 and 22.

Bias resistors 30 and 31 connect the emitters of transistors 21 and 22, respectively, to a negative power supply, $-V$. Load resistors 32 and 33 connect the collectors of transistors 21 and 22, respectively, to a positive power supply $+V$. Terminal 34, located between resistor 32 and the collector of transistor 21, can be used to read off the voltage across transistor 21. Terminal 35, located between resistor 33 and the collector of transistor 22, can be used to read off the voltage across transistor 22.

In operation, a constant voltage level from direct current power supply 28 is fed through a voltage divider 29 and diode 27 to the base of transistor 22 and serves as a reference voltage. Voltage divider 29 may be used to set the signal from power supply 28 at a preselected level indicative of a particular time in a forming cycle. This causes transistor 22 to conduct a current from the positive power supply $+V$, through resistor 33, through transistor 22, and to the negative power supply $-V$ through resistor 31.

The tunnel diode initially is in the lower one of its two stable voltage states up to the point where sufficient current flows through it to switch it into its higher stable state. Thus, transistors 21 and 22 act as emitter-followers so that the potential or voltage between the two transistors follows or is equal to the voltage or potential difference between the reference voltage and the variable voltage at any particular instant. Initially, the variable voltage is lower than the reference voltage and gradually increases throughout a portion or all of a processing cycle. The signal employed preferably is a saw-tooth waveform or a ramp function gradually increasing from a lower to an upper limit.

Since the tunnel diode initially is in the lower one of its two stable states, it correspondingly conducts a current with very little resistance. When the voltage between transistors 21 and 22 starts to become positive, that is, when the variable voltage becomes larger than the reference voltage, then the voltage and current across tunnel diode 20 rises in its characteristic fashion, until the peak point for that particular tunnel is reached. At this peak point, the tunnel diode resistance suddenly becomes negative and the voltage rapidly increases while the current rapidly decreases. The tunnel diode 20 has now been forced into its high voltage state thus conducting less current and imposing more resistance. This results in the generation of a pulse in the voltage measured at terminal 34 since less current passes through transistor 21. Likewise, a voltage pulse can be received at terminal 35 since transistor 22 now conducts more current at a lower voltage. The output pulse must, of course, be of sufficient duration and amplitude to energize the solenoid for a sufficient time to cause valve actuation, which can be achieved, for example, by connection of the valve to the movable core of the solenoid.

The reference voltage can be set at any particular level by a potentiometer or other means. Thus, a particular voltage level represents a particular cycle time relative to the variable voltage signal and can be used to generate a pulse for actuation of a valve at any particular cycle time.

Apparatus of the present invention could be used to control the operation of many different types of processing machines. For example, if the apparatus of the invention were to be used to control the operation of an I.S. glass-forming machine in which at least 19 or more functions must be performed by valves as described, it would be preferable to provide a system of at least thirty-eight or more circuits so that one circuit could be used to turn on a specific valve and a second circuit could be used to turn off that valve. Appropriate valves are preferably double acting. Thus, one signal generator could be used to supply signals to all the voltage comparator circuits required to control one section of an I.S. machine, though the preferable arrangement would be to have one signal generator supply a signal which would synchronize the operation of a group of sections comprising one I.S. machine lined up side-by-side. This would synchronize the forming steps of the process so that a number of sections could successively receive a gob from one gob feeder and many groups of machines could feed from the forehearth of a glass furnace. It should be understood that the circuits involved and the solenoid valves required are very well understood in the art and are very simple devices. Therefore, the large quantity of such circuits required would not constitute a large expense.

There has accordingly been shown and described herein a novel and unique automatic control system for a processing machine. As a part thereof, there has been additionally described a novel circuit arrangement for use with the above control system. It is apparent from the above description that the invention provides a novel control system which provides means for controlling separate functions in a process without the disadvantages of mechanical systems such as wear of mechanical timing and control parts. It is also apparent from the above description that the timing of the above control system can be adjusted and set without interfering with the operation of the machine and without requiring an operator to exhibit unreasonable dexterity or coordination. Furthermore, it can be seen that by merely increasing the number of simple circuits for a particular machine, many functions can be performed without the necessity of much additional space for equipment.

From the above description of the invention, it will be apparent that various modifications in the apparatus described in detail herein may be made within the scope of the invention. Thus, the number of circuits employed could vary depending on the type of process involved. Also, the type of signal generated could be different so long as a variable signal was employed throughout at least a portion of a processing cycle. Therefore, the invention is not to be limited to the specific details of the apparatus described herein, except as may be required by the following claims.

What is claimed is:

1. A voltage comparator circuit, comprising: a first transistor adapted to receive an input signal at one electrode; a second transistor adapted to receive a reference signal at one electrode; a tunnel diode having one terminal connected with a second electrode of said first transistor and the other terminal connected with a second electrode of said second transistor in a manner such that said tunnel diode is caused to switch from one stable state to its other stable state when an input signal received by said first transistor exceeds a predetermined magnitude with respect to a reference signal received by said second transistor; and output means connected to at least one of said transistors for coupling an output pulse from said circuit whenever said tunnel diode is caused to change states.

2. A voltage comparator circuit, comprising: a first transistor having first, second and third electrodes; first input means connected to said first electrode for providing a first input signal to said first transistor; a second transistor having first, second, and third electrodes; second input means connected to said first electrode of said second transistor for providing a reference input signal to said second transistor; means connected to said electrodes of said transistors to provide operating voltages thereto; a tunnel diode connected between said second electrodes of said transistors in a manner such that said tunnel diode is caused to switch from one stable state to the other stable state whenever said first input signal received by said first transistor exceeds a predetermined magnitude with respect to said reference voltage received by said second transistor; and output means connected to the third electrode of at least one of said transistors for coupling a pulse from said circuit whenever said tunnel diode is caused to change states.

3. In a control system, a voltage comparator circuit, comprising: a first transistor having its base connected to variable voltage signal generating means; a second transistor having its base connected to reference voltage signal generating means; means to provide a potential difference across each of said transistors; a tunnel diode connected between the emitters of said transistors, said tunnel diode having two stable states and being caused to switch from one said stable state to the other when the signal generated by said variable voltage signal generating means exceeds a predetermined magnitude with respect to the signal generated by said reference voltage generating means; and output means connected to at least one of said transistors for coupling a pulse from said circuit whenever said tunnel diode is caused to change states.

4. In a control system a voltage comparator circuit, comprising: a first transistor having its base connected to voltage signal generating means producing an input signal having a substantially uniformly varying amplitude during at least a portion of each cycle; a second transistor having its base connected to reference voltage signal generating means producing a reference signal having a substantially constant amplitude; means to provide a potential difference across each of said transistors; and a tunnel diode connected between the emitters of said transistors so that said tunnel diode is caused to operate in a forward direction so as to switch and generate a pulse when the amplitude of said input signal exceeds a predetermined amplitude with respect to said reference signal.

5. A voltage comparator circuit, comprising: a tunnel diode; a resistor in series with said tunnel diode; first and second transistors, the emitter of said first transistor being connected with the anode of said tunnel diode, and the emitter of said second transistor being connected with the cathode of said tunnel diode; circuit means connecting the base of said first transistor to a variable voltage signal source; circuit means connecting the base of said second transistor to a reference voltage signal generator; two bias resistors, one connecting the emitter of each of said first and second transistors to a negative potential; and two load resistors, one connecting the collector of each of said first and second transistors to a positive potential; said tunnel diode being caused to switch from one stable state to its other stable state and generate a pulse in response to a predetermined change in voltage across one of said transistors with respect to the other.

6. A valve control system, comprising: a first transistor adapted to receive an input signal at one electrode; a second transistor adapted to receive a reference signal at one electrode; a tunnel diode having one terminal connected to a second electrode of said first transistor and the other terminal connected to a second electrode of said second transistor in a manner such that said tunnel diode is caused to switch from one stable state to its other stable state when an input signal received by said first transistor exceeds a predetermined magnitude with respect to a reference signal received by said second transistor; output means connected to at least one of said transistors for coupling an output pulse from said transistors whenever said tunnel diode is caused to change states; and pulse-driven valve means connected to said output means.

7. An automatic control system, comprising: a plurality of voltage comparator circuits each of which produces an output pulse that is time-wise spaced from the output pulses produced by other said voltage comparator circuits, each said voltage comparator circuit including a first transistor adapted to receive an input signal at one electrode, a second transistor adapted to receive a reference signal at one electrode, a tunnel diode having one terminal connected with a second electrode of said first transistor and the other terminal connected with a second electrode of said second transistor in a manner such that said tunnel diode is caused to switch from one stable state to its other stable state when an input signal received by said first transistor exceeds a predetermined magnitude with respect to a reference signal received by said second transistor, and output means connected to at least one of said transistors for coupling said output pulse from said circuit whenever said tunnel diode is caused to change states; signal generating means for causing said voltage comparator circuits to sequentially produce output pulses; and a plurality of pulse-driven valve means each of which is connected to a different one of said output means whereby said valve means are sequentially driven by said plurality of voltage comparator circuits.

8. An automatic control system, comprising: signal generating means for generating a signal the amplitude of which varies in a predetermined manner; reference signal generating means; a plurality of comparator circuit means each of which receives said signal from said signal generating means and a reference signal of predetermined magnitude from said reference signal generating means, each said comparator circuit means generating a control pulse when said signal from said signal generating means exceeds a predetermined magnitude with respect to said reference signal coupled to said comparator circuit means from said reference signal generating means whereby said comparator circuits are caused to sequentially produce control pulses in a predetermined order; and pulse-driven valve means connected to said comparator circuit means so that said valve means are sequentially operated in a predetermined order.

9. An automatic control system, comprising: signal generating means for generating a signal the amplitude of which varies at substantially a uniform rate during at least a portion of each cycle; reference signal generating means for generating a reference signal, said reference signal generating means including means for adjusting the amplitude of said reference signal; a plurality of comparator circuit means each of which receives said varying signal from said signal generating means and a reference signal of predetermined amplitude from said reference signal generating means, said reference signal applied to each said comparator circuit means being of a different amplitude, and each said comparator circuit means producing a control pulse when said varying signal reaches a predetermined magnitude with respect to the amplitude of said reference signal coupled to that comparator circuit means so that said comparator circuit means produce a series of time-wise spaced pulses the order of which is determined by said reference signal applied to each said comparator circuit means; and pulse-driven valve means connected to said comparator circuit means so as to be driven in a predetermined sequential order thereby.

References Cited

UNITED STATES PATENTS

| 3,050,713 | 8/1962 | Harmon | 328—106 X |
|---|---|---|---|
| 3,052,852 | 9/1962 | Logan | 307—88.5 X |
| 3,122,729 | 2/1964 | Bothwell et al. | 328—148 X |
| 3,135,898 | 6/1964 | Manganalli | 317—123 |
| 3,179,813 | 4/1965 | Vernot et al. | 307—88.5 |
| 3,214,608 | 10/1965 | Mollinga | 307—88.5 |
| 3,219,842 | 11/1965 | Greunke et al. | 307—88.5 |

LEE T. HIX, *Primary Examiner.*

I. C. EDELL, *Assistant Examiner.*